(12) United States Patent
Buehle

(10) Patent No.: US 11,529,947 B2
(45) Date of Patent: Dec. 20, 2022

(54) METHOD FOR OPERATING A MOTOR VEHICLE DRIVE TRAIN

(71) Applicant: ZF Friedrichshafen AG, Friedrichshafen (DE)

(72) Inventor: Felix Buehle, Eriskirch (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 86 days.

(21) Appl. No.: 17/212,462

(22) Filed: Mar. 25, 2021

(65) Prior Publication Data

US 2021/0300330 A1    Sep. 30, 2021

(30) Foreign Application Priority Data

Mar. 26, 2020    (DE) .................. 10 2020 203 938.0

(51) Int. Cl.
  *B60W 20/40* (2016.01)
  *B60W 30/188* (2012.01)
  *B60W 20/20* (2016.01)

(52) U.S. Cl.
  CPC ............ *B60W 20/40* (2013.01); *B60W 20/20* (2013.01); *B60W 30/188* (2013.01); *B60W 2510/081* (2013.01)

(58) Field of Classification Search
  CPC .... B60W 20/40; B60W 20/20; B60W 30/188; B60W 2510/081
  See application file for complete search history.

(56) References Cited

U.S. PATENT DOCUMENTS

| 6,434,466 | B1* | 8/2002 | Robichaux ............ B60W 10/06 477/110 |
| 9,708,794 | B2 | 7/2017 | Rauma et al. |
| 2015/0134161 | A1* | 5/2015 | Yamazaki ....... B60W 30/18027 180/65.265 |
| 2015/0283996 | A1* | 10/2015 | Wang .................... B60W 10/08 180/65.265 |
| 2017/0282900 | A1* | 10/2017 | Suzuki .................. B60W 30/20 |
| 2019/0016330 | A1* | 1/2019 | McCullough ......... B60W 10/02 |
| 2019/0143961 | A1* | 5/2019 | Meyer ................... B60W 10/02 701/22 |
| 2019/0276001 | A1* | 9/2019 | Kava ................... B60W 50/082 |

FOREIGN PATENT DOCUMENTS

EP         2905162 A1    8/2015

* cited by examiner

*Primary Examiner* — George C Jin
(74) *Attorney, Agent, or Firm* — Dority & Manning, P.A.

(57) ABSTRACT

A method for operating a drive train of a motor vehicle, which utilizes at least one permanent-magnet electric machine (EM) as a motor vehicle drive source, is provided. A transmission (G) with different gear ratios is arranged in a power path between the electric machine (EM) and driving wheels (DW) of the motor vehicle. A power converter (LE) is associated with the electric machine (EM) and can operate the electric machine (EM) in a field weakening condition. The method includes prematurely carrying out, delaying, or preventing a changeover of the gear step of the transmission (G) specified by a driving strategy depending on a temperature value of the electric machine (EM) in order to reduce, not increase, or increase with delay a rotational speed of the electric machine (EM). An electronic control unit (ECU) for carrying out the method and a motor vehicle with the control unit (ECU) are also provided.

14 Claims, 3 Drawing Sheets

METHOD FOR OPERATING A MOTOR VEHICLE DRIVE TRAIN

CROSS-REFERENCE TO RELATED APPLICATION

The present application is related and has right of priority to German Patent Application No. 102020203938.0 filed in the German Patent Office on Mar. 26, 2020, which is incorporated by reference in its entirety for all purposes.

FIELD OF THE INVENTION

The invention relates generally to a method for operating a drive train of a motor vehicle. The invention further relates generally to an electronic control unit for implementing such method, and to a motor vehicle with such control unit.

BACKGROUND

In motor vehicles with an electric drive, permanent-magnet electric machines are frequently utilized, in particular permanent-magnet synchronous machines. These types of electric machines are distinguished by a high-power density and good efficiency.

In permanent-magnet electric machines, the voltage induced by the rotor in the stator is directly proportional to the rotational speed of the rotor. If the voltage induced in the stator in this way exceeds the voltage of the power supply, current is fed back into the power supply. As a result, the power supply can be overloaded. This problem occurs, in particular, at a relatively low nominal voltage of the power supply, for example, at a nominal voltage of forty-eight volts (48 V). In order to be able to operate a permanent-magnet electric machine also in this speed range, various measures for field weakening are known. For example, by suitable energization of the stator, an air gap field component can be generated, which counteracts the exciter field generated by the permanent magnet of the rotor and, thereby, weakens the exciter field. This active energization heats the stator and the associated power electronics, however, and, thereby, reduces the efficiency of the drive system.

EP 2 905 162 A1 describes an electromechanical drive with an electric machine, a multi-stage transmission, and an electrical power converter. The electrical power converter includes a control unit, which controls, by way of an open-loop system, a gear step of the transmission depending on a rotational speed/torque operating point of the transmission output shaft and depending on a condition of the electric machine. If the electric machine reaches a field weakening condition, the transmission is shifted from a higher gear step to a lower gear step, in order not to operate the machine with reduced efficiency.

Such a method limits the operating range of the electric machine, however, since a field weakening mode is avoided by the transmission shift.

SUMMARY OF THE INVENTION

Example aspects of the invention provide a method for operating a motor vehicle drive train with a permanent-magnet electric machine, which allows for a reliable operation of the electric machine while utilizing the field weakening operating range.

A method is provided for operating a motor vehicle drive train, which utilizes at least one permanent-magnet electric machine with a rotationally fixed stator and a rotary rotor as the motor vehicle drive source. Preferably, a permanent-magnet synchronous machine is utilized. In addition to the electric machine, an internal combustion engine can be present as a further drive source of the drive train. The drive train includes a transmission in the power flow between the electric machine and driving wheels of the motor vehicle. The transmission is configured for setting different gear ratios between an input shaft and an output shaft of the transmission. The transmission can be, for example, an automatic transmission, an automated manual transmission, a dual clutch transmission, or an infinitely variable CVT transmission.

A selection of the gear ratios of the transmission takes place depending on a driving strategy of the motor vehicle. For this purpose, an electronic control unit is provided, which actuates the shift actuators of the transmission depending on operating conditions of the motor vehicle. In the process, for example, a specified input torque, an actual speed of the motor vehicle, and a rotational speed/torque characteristic of the drive source(s) of the motor vehicle are taken into account.

A power converter is associated with the electric machine. The power converter is configured for converting a DC voltage of an electrical power supply into an AC voltage suitable for the operation of the electric machine. The power converter can operate the electric machine, as necessary, in a field weakening condition. In the field weakening condition, a magnetic field of the stator counteracts a magnetic field of the permanent-magnet rotor, in order to reduce the voltage induced by the rotor in the stator.

In order to determine the load of the electric machine and/or the power converter, a temperature value of at least one of these elements is determined. The determination can be ascertained directly by utilizing a temperature sensor or indirectly by utilizing other sensor signals. For example, the temperature value can be determined computationally based on a current draw of the power converter.

A changeover of the gear ratio of the transmission specified by the driving strategy is now prematurely carried out, delayed, or prevented depending on the temperature value. As a result, a rotational speed of the rotor is to be reduced, not increased, or at least increased with delay. Due to this measure, the mean rotational speed of the electric machine is reduced, whereby the voltage induced by the rotor in the stator is reduced. As a result, less current needs to be utilized for the field weakening, and so the thermal load of the stator and also of the power converter is reduced. Additionally, that much more current can be utilized for setting the torque of the electric machine, without overloading the electrical power supply or overheating the electric machine.

Preferably, the gear ratio changeover is prematurely carried out, delayed, or prevented depending on the temperature value only for the case in which the electric machine is operated in the field weakening condition. As a result, an unnecessary influence on the gear selection according to the driving strategy is avoided.

Preferably, at least one threshold value of the driving strategy, which influences a changeover of the transmission gear ratio, changes depending on the temperature value. This threshold value is, for example, the speed of the motor vehicle, the rotational speed of at least one drive source, or a specified input torque of the motor vehicle. A change of multiple threshold values of the driving strategy depending on the temperature value may be utilized in certain example embodiments.

According to one preferred example embodiment, there is a direct dependence on the temperature value. In this way, the changeover of the gear ratio of the transmission specified by the driving strategy is prematurely carried out, delayed, or prevented for the case in which the temperature value reaches or exceeds a limiting value. Alternatively, the changeover of the gear ratio of the transmission specified by the driving strategy is prematurely carried out, delayed, or prevented for the case in which a gradient of the temperature value reaches or exceeds a limiting value. As a result, an increasing temperature of the electric machine and/or of the power converter can be responded to early.

Preferably, the taking into account of the temperature value during the selection of the transmission gear ratio is finished when the temperature value reaches or falls below a defined amount. As a result, an unnecessary influence on the gear selection according to the driving strategy is avoided.

The actual measure under consideration of the temperature value depends on the present driving situation of the motor vehicle. In this way, an upshift is preferably prematurely carried out and a downshift is prevented or delayed. As a result, a mean rotational speed of the rotor can be reduced.

The method is preferably carried out by an electronic control unit. The electronic control unit can be an integral part of a motor vehicle, preferably an electric vehicle or a hybrid vehicle. The method is advantageous, in particular, in the case of motor vehicles with a relatively low nominal voltage of the main drive power circuit, for example at a nominal voltage less than one hundred volts (100 V), particularly preferably at a nominal voltage of forty-eight volts (48 V).

BRIEF DESCRIPTION OF THE DRAWINGS

Exemplary embodiments of the invention are described in detail with reference to the following figures. Wherein.

DETAILED DESCRIPTION

Figure 1:
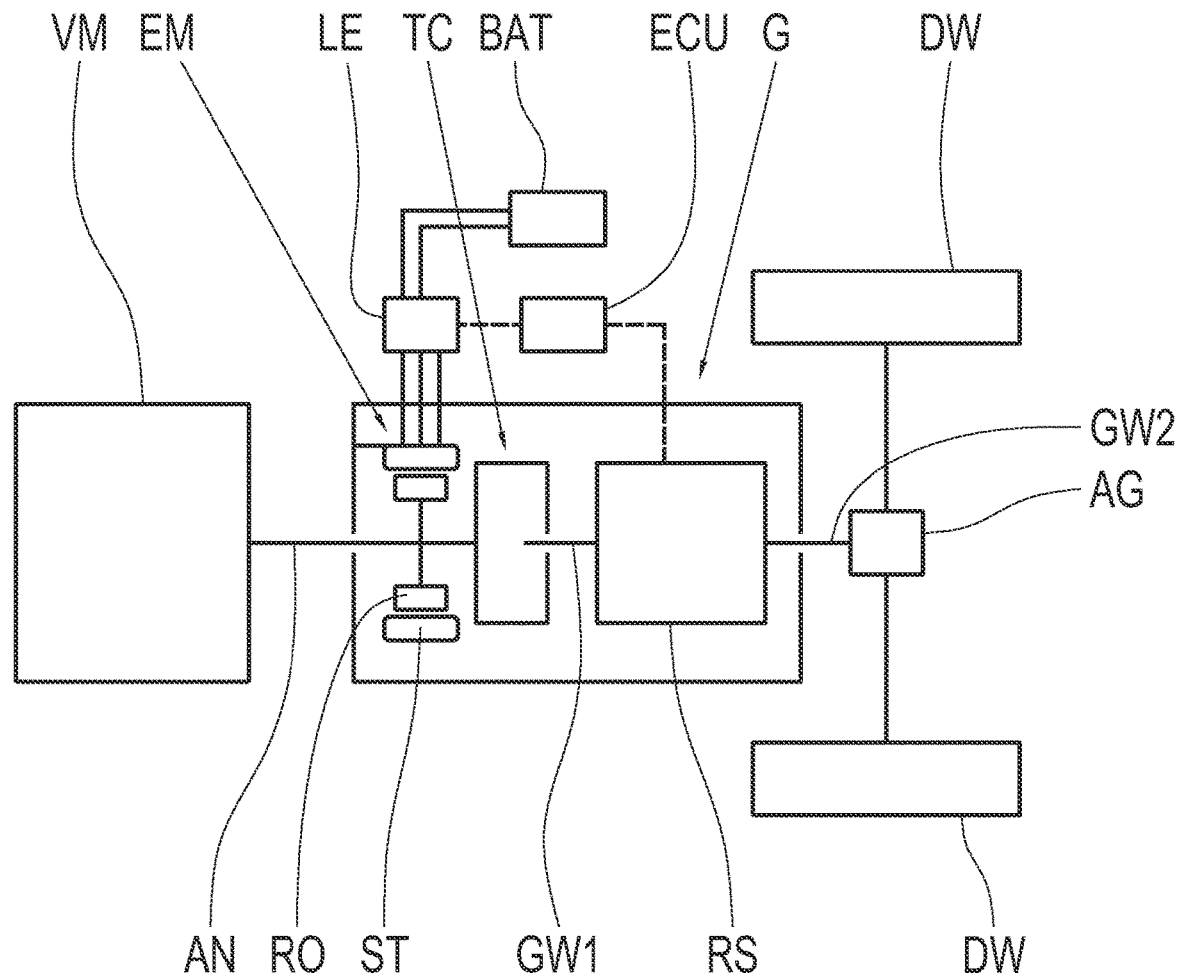
FIG. 1 and FIG. 2 each show a diagrammatic view of a motor vehicle drive train with an electric machine.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 diagrammatically shows a drive train for a motor vehicle. The drive train includes an internal combustion engine VM, the output of which is connected to a connection shaft AN of a transmission G. The transmission G forms a hybrid drive train unit of the drive train, and includes an electric machine EM with a rotationally fixed stator ST and a rotary rotor RO. The rotor RO is connected to the connection shaft AN and to a torque converter TC. On the output end, the torque converter TC is connected to an input shaft GW1 of a transmission gear set RS. An output shaft GW2 of the transmission gear set RS is connected to driving wheels DW of the motor vehicle via a differential gear AG.

The electric machine EM is designed as a permanent-magnet synchronous machine. The stator ST is connected to a power converter LE via three phases. The power converter LE is configured for converting a DC voltage of an electrical power supply BAT into an AC voltage suitable for the operation of the electric machine EM. The power supply BAT can be provided exclusively for the electric machine EM or also supply other electrical consumers of the motor vehicle with electrical energy. The power supply BAT can be the only power supply of the main power circuit of the motor vehicle. The power supply BAT is designed, for example, as a battery. The nominal voltage of the battery BAT can be, for example, forty-eight volts (48 V). The power converter LE is configured for operating the electric machine EM, as necessary, in a field weakening condition, wherein, in the field weakening condition, a magnetic field of the stator ST counteracts a magnetic field of the permanent-magnet rotor RO, in order to reduce the voltage induced by the rotor RO in the stator ST.

The power converter LE is connected to an electronic control unit ECU. The electronic control unit ECU is configured for receiving and processing various signals. For this purpose, the electronic control unit ECU can have a communication link to other control units (not represented), such as, for example, an internal combustion engine control unit. Additionally, the electronic control unit ECU can process sensor signals of the transmission G, for example, the rotational speed of the transmission output shaft GW2. The electronic control unit ECU controls, by way of an open-loop system, the gear ratios of the transmission G based on various signals and a driving strategy stored in the electronic control unit ECU. The driving strategy can control, by way of an open-loop system, for example, the gear ratios of the transmission G in such a way that the motor vehicle is operated as fuel-efficiently as possible. For the open-loop control of the gear ratios, the electronic control unit ECU is connected to the transmission G. For example, the electronic control unit ECU controls, by way of an open-loop system, the output stages of an electro-mechanical or electro-hydraulic actuator system of the transmission G.

In one alternative example embodiment, the electronic control unit ECU does not communicate directly with the power converter LE. Instead, the electronic control unit ECU communicates with a higher-order drive controller, which is associated, for example, with the internal combustion engine VM. This higher-order drive controller controls, by way of an open-loop system, the torque output and response of the internal combustion engine VM and the electric machine EM.

Figure 2:
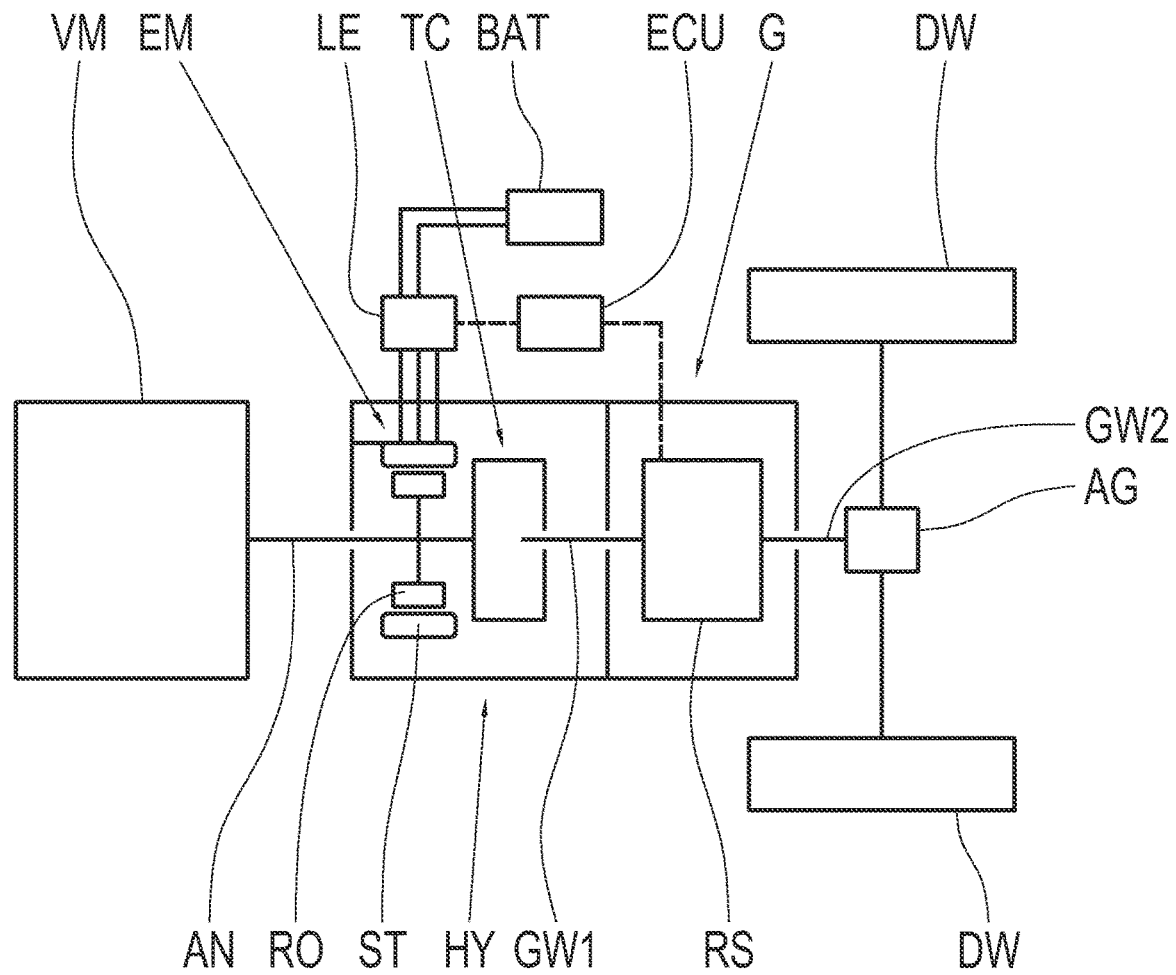

FIG. 2 diagrammatically shows a drive train, in which an electric machine is not contained in the transmission G. Instead, a hybrid module HY is provided between the internal combustion engine VM and the transmission G. In this example embodiment, the hybrid module HY includes the electric machine EM, and so the hybrid module HY forms the hybrid drive unit of the drive train. In the exemplary embodiment represented in FIG. 2, the torque converter TC is also an integral part of the hybrid module HY. Alternatively, the torque converter TC could be an integral part of the transmission G.

Figure 3:
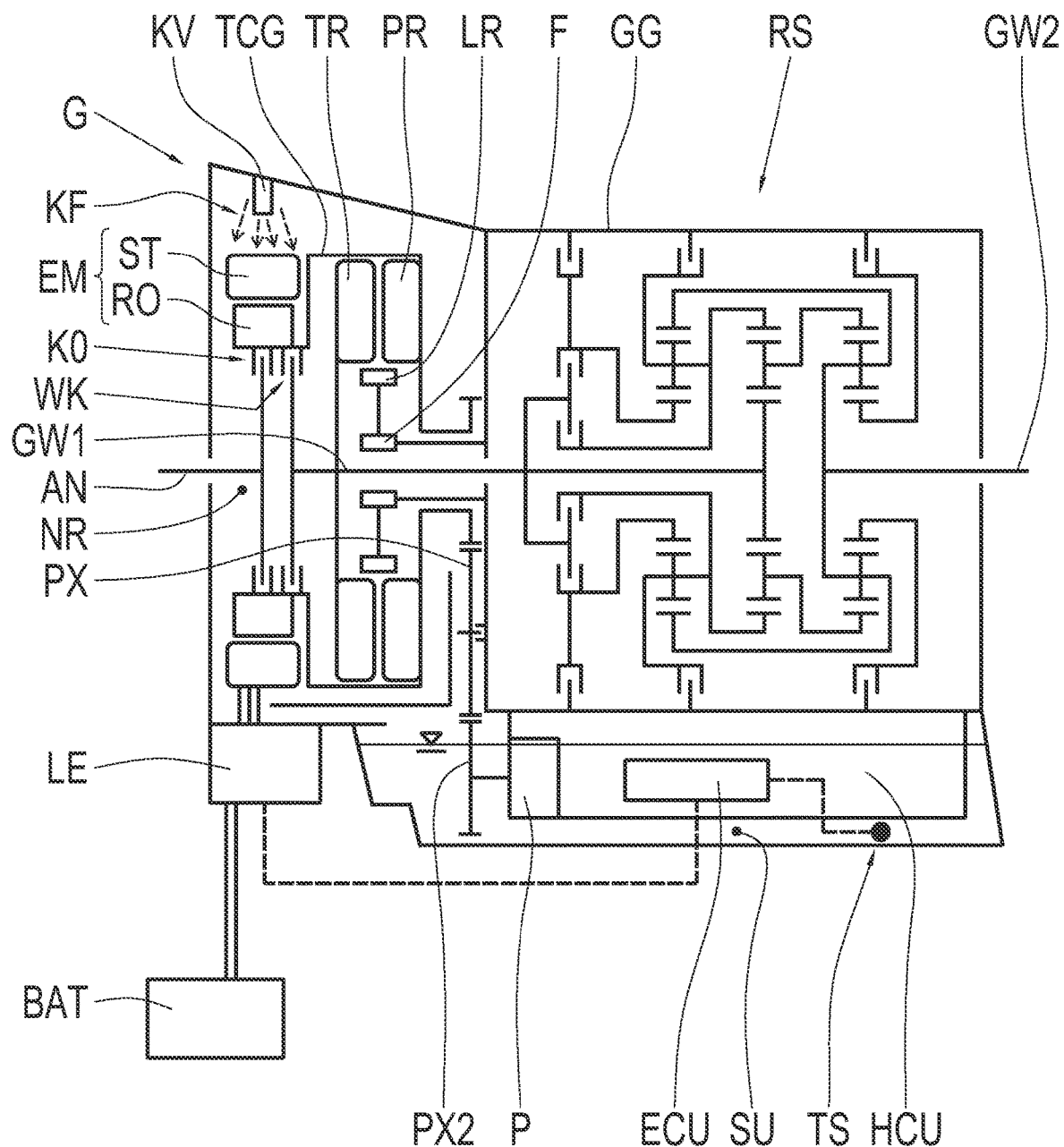
FIG. 3 shows a diagrammatic sectional view of a transmission with the electric machine.

FIG. 3 shows a diagrammatic sectional view of a hybrid drive unit of the motor vehicle drive train, in the represented exemplary embodiment as a transmission G with an electric machine EM. The transmission gear set RS includes multiple planetary gear sets by way of example. Alternatively or additionally, the transmission gear set RS can be formed from multiple spur gear trains and/or from a flexible traction drive mechanism, for example, as a CVT transmission. The transmission gear set RS, together with the shift elements arranged therein, is configured for providing different transmission ratios between the input shaft GW1 and the output shaft GW2. The transmission gear set RS is enclosed by a housing GG. The housing GG can include multiple individual parts.

The transmission G includes a cavity NR on the input side. The torque converter TC and the electric machine EM are arranged in the cavity NR. The torque converter TC includes an impeller PR, a turbine wheel TR, and a stator LR, which cooperate hydrodynamically in a known way. The impeller PR is connected to a torque converter housing TCG. The connection shaft AN is connected to the rotor RO and to the impeller PR via an optional separating clutch K0. The input shaft GW1 is connected to the turbine wheel TR. The impeller PR and the turbine wheel TR are mechanically connectable to each other by a torque converter lockup clutch WK, and so, in the engaged condition of the torque converter lockup clutch WK, the torque converter TC is locked up. The stator LR is supported at the housing GG via a freewheel unit F. Further components, for example, one or multiple torsional vibration damper(s), can be arranged in the cavity NR.

Moreover, the transmission G includes an oil sump SU, an oil pump P, and a hydraulic control unit HCU. The oil level in the oil sump SU is indicated in FIG. 3. The oil level varies, of course, depending on the temperature of the oil, the geometric position of the transmission G, and centrifugal forces acting on the oil. The transmission G can also include an oil reservoir (not represented in FIG. 3). The oil pump P is configured for scavenging oil out of the oil sump SU and delivering the oil to the hydraulic control unit HCU. For this purpose, the pump P is driven via two gearwheels PX, PX2. The gearwheels PX, PX2 form drive elements of the oil pump P. The gearwheel PX is driven by a gearwheel, which is connected to the torque converter housing TCG. The gearwheel PX2 is connected to an input shaft of the oil pump P. The hydraulic control unit HCU is configured for feeding the oil delivered by the pump P to various hydraulic consumers of the transmission G, for example, to components of the gear set RS, including the shift elements, to the torque converter TC, to the torque converter lockup clutch WK, and to the cooling of the electric machine EM. The oil delivered in such a way then flows back into the oil sump SU, and so a closed oil circuit is formed.

The cavity NR forms a wet space of the transmission G. In order to cool the electric machine EM, a cooling device KV is provided, which delivers cooling oil KF to the electric machine EM. The cooling oil KF flows down at the electric machine EM, and so thermal energy is transferred from the electric machine EM to the cooling oil KF.

The electronic control unit ECU controls, by way of an open-loop system, the actuators of the hydraulic control unit HCU, and is also arranged in the area of the oil sump SU. The electronic control unit ECU is connected to a temperature sensor TS, which measures the temperature of the oil in the oil sump SU. Based on the temperature measured with the temperature sensor TS, a temperature value of the electric machine EM can be determined. For this purpose, further parameters can be utilized, such as, for example, the electric current supplied to the electric machine EM, the heating-up and cooling-down characteristics of the electric machine EM, and the flow rate of the cooling oil KF. With this information, a temperature model of the electric machine EM can be formed. In the same way, a temperature model of the power converter LE can be formed. The power converter LE can include a cooling system separated from the transmission G. In one alternative embodiment, the electric machine EM can also be cooled by a cooling system separated from the transmission G. In this way, for example, the electric machine EM can be connected to the cooling system of the internal combustion engine VM, and the power converter LE can be connected to an air-conditioning system of the vehicle interior space.

If a changeover of the gear ratio of the transmission G is now specified by the driving strategy, this gearchange can be prematurely carried out, delayed, or prevented depending on the temperature of the electric machine EM and/or of the power converter LE. As a result, a rotational speed of the rotor RO is either reduced, not increased, or increased with delay. This temperature influence on the implementation of the gearchange is preferably carried out only for the case in which the power converter LE operates the electric machine EM in the field weakening condition. For example, in this case, a threshold value of the driving strategy, which influences a changeover of the gear step engaged in the transmission G, can be changed depending on the temperature of the electric machine EM and/or of the power converter LE.

There can be a direct dependence of the shift strategy of the transmission G on the temperature of the electric machine EM and/or of the power converter LE. For example, a gearchange is prematurely carried out, delayed, or prevented for the case in which the appropriate temperature value reaches or exceeds a limiting value. Alternatively, a dependence on a gradient of the temperature value with respect to time can be utilized. As a result, a temperature increase of the electric machine EM and/or of the power converter LE can be responded to early.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

| Reference characters | |
|---|---|
| VM | internal combustion engine |
| HY | hybrid module |
| G | transmission |
| AN | connection shaft |
| GG | housing |
| AG | differential gear |
| DW | driving wheel |
| EM | electric machine |
| ST | stator |
| RO | rotor |
| LE | power converter |
| BAT | electrical power supply |
| ECU | electronic control unit |
| TS | temperature sensor |
| KV | cooling device |
| KF | cooling oil |
| TC | torque converter |
| TCG | torque converter housing |
| TR | turbine wheel |
| PR | impeller |
| LR | stator |
| F | freewheel unit |
| WK | torque converter lockup clutch |
| RS | transmission gear set |

-continued

| Reference characters | |
|---|---|
| GW1 | input shaft |
| GW2 | output shaft |
| HCU | hydraulic control unit |
| P | oil pump |
| SU | oil sump |
| PX, PX2 | drive elements of the oil pump |
| K0 | separating clutch |
| NR | wet space |

The invention claimed is:

1. A method for operating a drive train of a motor vehicle, the drive train utilizing at least one permanent-magnet electric machine (EM) as the motor vehicle drive source, the at least one permanent-magnet electric machine (EM) including a rotationally fixed stator (ST) and a permanent-magnet rotor (RO), a transmission (G) arranged in a power flow between the electric machine (EM) and driving wheels (DW) of the motor vehicle, the transmission (G) configured for selectively implementing different gear ratios between an input shaft (GW1) and an output shaft (GW2) of the transmission (G), a power converter (LE) associated with the electric machine (EM) and configured for converting a direct current voltage of an electrical power supply (BAT) into an alternating current voltage for operation of the electric machine (EM), the method comprising:
 selecting one of the gear ratios of the transmission (G) depending on a driving strategy of the motor vehicle;
 operating the electric machine (EM) in a field weakening condition with the power converter (LE), a magnetic field of the stator (ST) counteracting a magnetic field of the permanent-magnet rotor (RO) in the field weakening condition in order to reduce a voltage induced by the rotor (RO) in the stator (ST);
 determining a temperature value of the electric machine (EM) and/or of the power converter (LE); and
 depending on the temperature value, adjusting a changeover of the one of the gear ratios of the transmission (G) specified by the driving strategy via prematurely carrying out, delaying, or preventing the changeover in order to reduce, not increase, or increase with delay a rotational speed of the rotor (RO).

2. The method of claim 1, wherein the changeover is adjusted depending on the temperature value only when the electric machine (EM) is operated in the field weakening condition.

3. The method of claim 1, wherein at least one threshold value of the driving strategy, which influences the changeover, changes depending on the temperature value.

4. The method of claim 1, wherein adjusting the changeover comprises adjusting the changeover of the one of the gear ratios of the transmission (G) specified by the driving strategy in response to the temperature value reaching or exceeding the limiting value.

5. The method of claim 1, wherein adjusting the changeover comprises adjusting the changeover of the one of the gear ratios of the transmission (G) specified by the driving strategy in response to a gradient of the temperature value reaching or exceeding a limiting value.

6. The method of claim 1, further comprising terminating adjustment of the changeover based on the temperature value in response to the temperature value reaching or falling below a defined value.

7. The method of claim 1, wherein adjusting the changeover comprises adjusting an upshift of the transmission (G) via prematurely carrying out the upshift in order to reduce the rotational-speed the rotor (RO).

8. The method of claim 1, wherein adjusting the changeover comprises adjusting a downshift of the transmission (G) via preventing the downshift in order to not increase the rotational-speed of the rotor (RO).

9. The method of claim 1, wherein adjusting the changeover comprises adjusting a downshift of the transmission (G) via delaying the downshift in order to delay an increase in the rotational-speed of the rotor (RO).

10. An electronic control unit (ECU), wherein the electronic control unit (ECU) is configured for implementing the method of claim 1.

11. A motor vehicle, comprising the electronic control unit (ECU) of claim 10.

12. The motor vehicle of claim 11, wherein the motor vehicle is an electric vehicle or a hybrid vehicle.

13. The motor vehicle of claim 12, wherein an electrical main drive power circuit of the motor vehicle has a nominal voltage less than one hundred volts.

14. The motor vehicle of claim 13, wherein the nominal voltage is forty-eight volts.

* * * * *